United States Patent Office 2,920,233
Patented Jan. 5, 1960

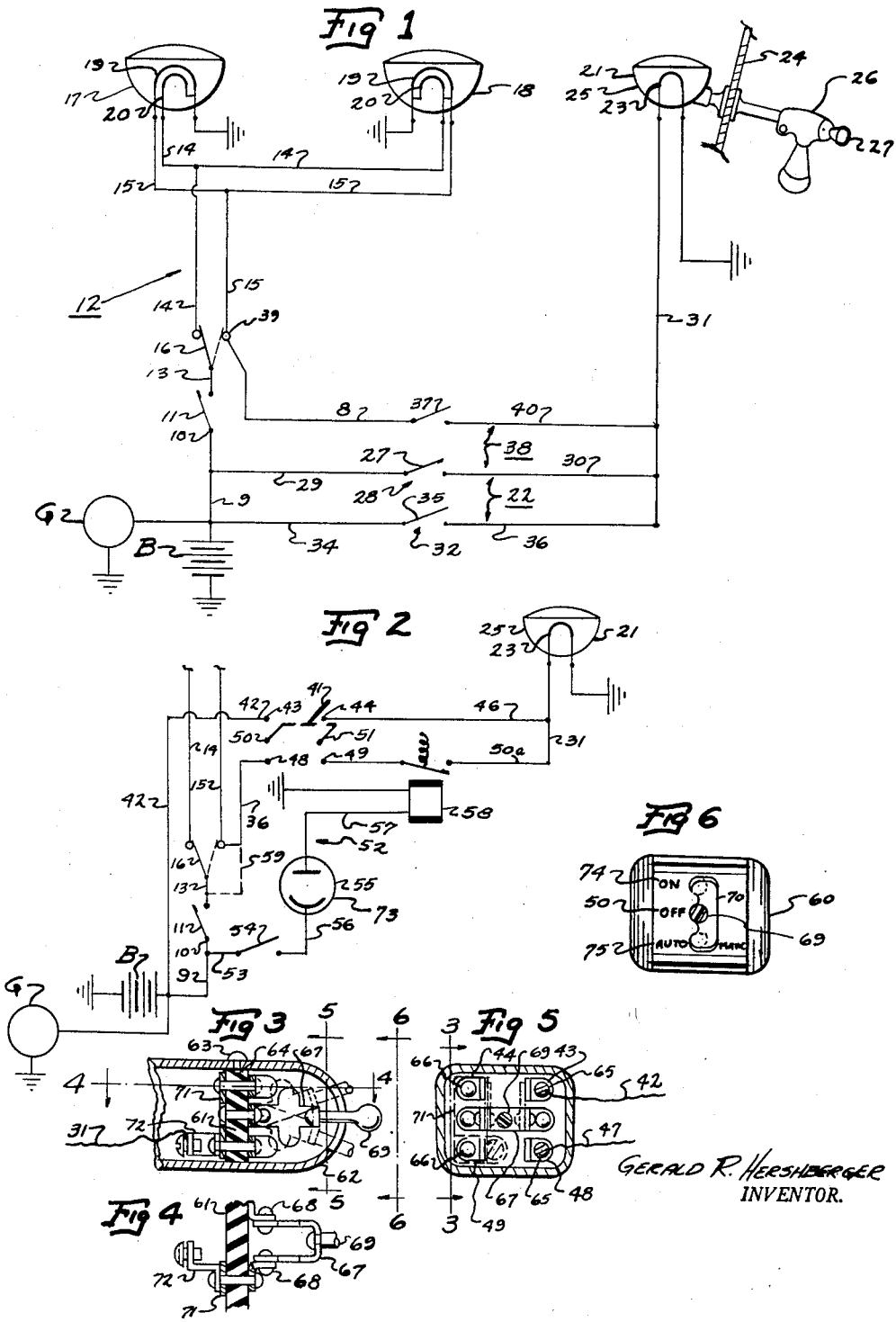
Jan. 5, 1960     G. R. HERSHBERGER     2,920,233
DRIVING LIGHT CONTROL
Filed Sept. 17, 1956     2 Sheets-Sheet 1
GERALD R. HERSHBERGER
INVENTOR.

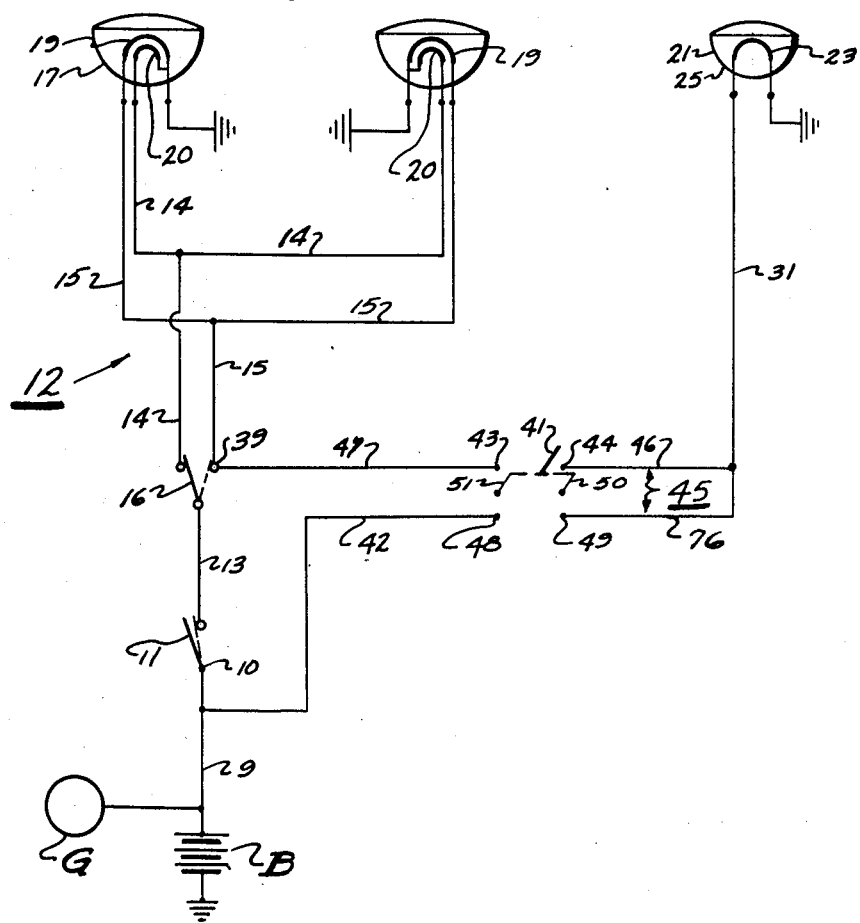

2,920,233

DRIVING LIGHT CONTROL

Gerald R. Hershberger, Troy, Mich.

Application September 17, 1956, Serial No. 610,071

44 Claims. (Cl. 315—83)

This invention relates to lighting systems for power vehicles such as automobiles or other motor vehicles, and more particularly to control systems for the auxiliary type of driving light such as the spotlight. The spotlight has found limited or restricted use as a driving light because of the necessity of the driver of the vehicle to de-energize the light by hand each time another vehicle is passed to avoid blinding the driver of the other vehicle with the glare of the spotlight. This invention will provide for greater usefulness of the spotlight by providing control systems to eliminate this factor.

It is an object of this invention to provide for semi-automatic operation of the spotlight by use of a foot-selector switch or dimmer switch in place of or in conjunction with a hand switch, thus freeing the hands of the driver for use on the steering wheel or other important functions.

It is an object of this invention to provide for automatic operation of the driving light or spotlight in response to the lights of approaching vehicles, and for combinations of manual, semi-automatic, and automatic controls for spotlight operation.

It is an object of this invention to combine elements of a headlighting system of a motor vehicle with elements of a driving light system to control said spotlight.

A still further object of my invention is to provide for unique switching means to accomplish the foregoing objects.

Other objects and advantages and a fuller understanding of the invention will be apparent from the following description and claims taken in conjunction with the accompanying drawings in which:

Fig. 1 is an electric circuit diagram of the manual and semi-automatic operation of the spotlight in connection with a motor vehicle headlighting system, and a foot-selector switch.

Fig. 2 is an electric circuit diagram of the manual, semi-automatic, and automatic controls for the spotlight.

Fig. 3 is an elevational sectional view taken through the spotlight housing along line 3—3 of Fig. 5.

Fig. 4 is a sectional plan view taken along line 4—4 of Fig. 3.

Fig. 5 is a sectional end view of the housing taken along line 5—5 of Fig. 3.

Fig. 6 is an end view of the spotlight housing taken along line 6—6 of Fig. 3.

Fig. 7 is an electric circuit diagram of a unique switching modification of the invention.

Referring now to to Fig. 1, there is illustrated very diagrammatically the features of the usual headlighting system 12 of a petroleum propelled automobile which are important to my invention. Accordingly, there is shown a double source of electric energy, such as a storage battery B, and a generator G, connected in parallel to a power supply circuit 9 which is connected to a live contact or switch element 10 of an interposed light switch 11 which controls energization of headlights 17 and 18 from the sources B and G through a circuit 13 from the switch 11 with branches 14 and 15 alternatively connectable thereto by the foot-selector switch 16 to the headlights 17 and 18 whose upper beam filament or brighter filament 19—19 are connected in parallel to the circuit branch 15 and whose other filaments 20—20 are connected in parallel to the circuit branch 14. The return circuits to the source B and G are indicated by ground connections.

As thus far explained only the elements of an automobile headlighting system which are pertinent to an understanding of, and to the workings of my invention have been described and the other various usual features and details of such a system such as tail lights and parking lights (not shown) that are not essential to an understanding of my invention have neither been illustrated nor referred to.

For the purpose of controlling an auxiliary light or spotlight in accordance with my invention, a spotlight 21 having a single filament lamp 23 is shown mounted on a vehicle 24. The spotlight 21 is of the usual construction consisting of a pivotable lamp casing 25 exterior of the vehicle 24, controlled from inside of the vehicle 24 by means of a handle 26. The lamp 23 may be energized in conventional manner from battery G by means of switch 27 mounted on the handle 26 of the spotlight 21.

The separate spotlight foot-selector system 22 for controlling the spotlight 21 consists of the usual spotlight energizing circuit 28 which has a lead 29 connected on one end to the power supply circuit 9 and on the other end to conventional switch 27, which is in turn connected to the lamp 23 by leads 30 and 31; and a foot-selector circuit 32 which shunts the conventional circuit 28 and permits energization of the spotlight 21 when the conventional switch 27 is open. The foot-selector circuit 32 is shown as comprising a lead 34 which is connected to the foot-selector switch 35, a lead 36 which is connected from the foot-selector switch 35 to a switch 35a, and a lead 36a which is connected from switch 35a to a lead 31 completing the circuit from the power supply circuit 9 to the lamp 23. It will now be seen that the lamp 23 may be operated by use of the hand switch 27 with the foot selector switch 35 open, or by the foot switch 35 with the hand switch 27 open, and switch 35a closed. The use of switch 35 frees the hands of the operator for better control of the vehicle. The opening of the foot-selector switch 35 by means of the foot when the switch 27 is open will completely de-energize the lamp 23, in distinction with the operation of the conventional dimmer switch in use for controlling headlight systems wherein a different beam is selected rather than complete de-energization of the headlamp. It is practicable only to completely de-energize the spotlight because the spotlight is an auxiliary light and not required for illumination when passing other vehicles.

Since a foot-selector switch or dimmer switch is presently being used to control headlight filaments, a combination of the headlight circuit and the spotlight circuit is desirable, as the spotlight, through a novel arrangement, may be operated by said dimmer switch in conjunction with said headlights. Said combination or semi-automatic system 38 is comprised of a lead 8 which is connected to the upper filament terminal 39 of the dimmer switch 16 and to an interposed switch 37 which may be mounted in any convenient location on the vehicle 24. A lead 40 from the switch 37 to lead 31 completes the circuit to the spotlight 21. The balance of the semi-automatic system 38 is comprised of the conventional spotlight energizing circuit 28 previously described. In the semi-automatic operation the switch 27 is opened, the switch 37 is closed, and the lighting switch 11 is closed energizing the headlighting system; accordingly, when the dimmer switch 16 is moved to select the upper filaments 19—19 the switch 16 contacts the terminal 39 and the semi-automatic system 38 is energized from the battery B through circuit 9, lead 13, switch 16, lead 8, switch 37, lead 40, and lead 31 to lamp 23 energizing said lamp. Conversely, when the switch 16 is moved to select the lower beam filament 20—20 the semi-automatic system is de-energized. The switch 27 may be manually closed to shunt the lighting switch to provide energization of the lamp 23 with the lighting switch closed.

Referring to Fig. 7a further modification of the semi-automatic operation is made by utilizing a double pole double throw switch 41 which incorporated switch 37 and 27 in one unit which may be mounted in any convenient place on the vehicle, or preferably in the handle or housing 26 of the spotlight 21. The double pole double throw switch system 45 is comprised of a lead 42 connected to the power supply circuit 9 and to a terminal post 48, a lead 76 which is connected from terminal post 49 to lead 31, which in turn is connected to the lamp 23 completing the manually operated circuit. A lead 47 connects another terminal post 43 of the switch 41 to the upper filament terminal 39 of the dimmer switch 16, and a lead 46 connects the terminal post 44 to the lead 31 and thence to the lamp 23 completing the semi-automatic circuit. It will thus be seen that when the contactor 51 of the switch 41 is moved to contact terminal posts 48 and 49 the circuit to the dimmer switch is open, and the spotlight is continuously energized, and when the contactor 51 is moved to contact the terminal posts 43 and 44 the spotlight 21 is in cooperation with the headlights 17 and 18 and is energized with the dimmer switch in the upper beam filament position contacting terminal 39, and with the switch 41 in off position 50 neither circuit is energized.

Referring to Fig. 2, control systems for manually operated, semi-automatic operation, and fully automatic operation of the spotlight 21 are illustrated. Portions of the system previously described that are pertinent to an understanding of this modification are reproduced in Fig. 2. This modification utilizes the double pole double throw switch system 45 previously described in combination with a fully automatic system 52. In system 52 a lead 53 is connected to power supply circuit 9 to an interposed switch 54, a lead 56 connects switch 54 to photoelectric system 55, and a lead 57 connects the photoelectric system to the circuit breaker 58. The circuit breaker 58 is interposed in lead 50a between the dimmer switch 16 and the lamp 23 and is operable to break the circuit to the lamp 23 when the circuit breaker 58 is energized by the photoelectric system 55, said photoelectric system 55 being initially energized by lights from a passing vehicle striking a photoelectric cell 73 in the photoelectric system 55. It is understood that the dimmer switch must be in upper beam position contacting terminal 39 so that the lamp 23 is energized in accordance with a previous description. It is also understood that the dimmer switch will over-ride the operation of the automatic system and de-energize the spotlight 21 in the event that the operator moves said dimmer switch 16 to the lower beam position. A fully automatic system may be obtained by shunting the dimmer switch 16 by means of a lead 59 which is connected to lead 13 and to lead 36. The automatic system may be energized and de-energized by means of switch 54.

Referring to Figures 3, 4, 5, and 6 a double throw double pole switch device is illustrated which is suitable for use with the control systems previously described. The switch device is shown preferably mounted in the handle 26 of the spotlight 21 but it is understood that the switch may be mounted in any convenient location on the vehicle 24 or on the spotlight 21. The switch device 60 is comprised in part of an insulating block 61 mounted within the handle housing 62 by means of rivets 63 or other suitable fastening means, said means being pressed into the casing 62 and protruding into prepared holes 64 in the block 61 retaining said block securely in said casing. The insulating block 61 supports the terminal posts 43, 44, 48 and 49; the terminal posts 44 and 49 being secured to said block by means of screws 65, and the terminal posts 43 and 48 by means of rivets 66. A switch contactor 67 is placed intermediate said terminal posts for alternate engagement with said terminal posts when said switch contactor is rotated about support 68. The switch contactor is provided with a handle 69 of suitable plastic material which is resilient and has insulating qualities, said handle resiliently engaging spaced grooves 70 in the housing which guide and spring the switch contactor 67 into on position 74, off position 50, or automatic position 75 and holding said switch contactor releasably in said positions for manual movement. A connector 71 is placed across terminal posts 44 and 49 on one side of said contactor and is held in place by the same rivets 66 which secure said terminal posts 44 and 49. A terminal bracket 72 is secured by one of said rivets 66 to said connector and said terminal post 48, said bracket having a fastening screw 73 in one end of said bracket for securing the lead wire 31. The connector 71 eliminates the need for leads 46 and 76 in systems not requiring said leads. The lead wires 42 and 47 are fastened to terminal posts 43 and 48 by means of the same screws that secure terminal posts 44 and 49 to insulating block 61.

While certain forms and arrangements of the elements employed in the invention are disclosed herein, it will be understood that these are illustrative and that various changes may be made therein without departing from the invention as defined by the appended claims.

What is desired to secure by Letters Patent is:

I claim:

1. In combination with a motor vehicle headlighting system, comprising, a source of electric energy, an upper light beam filament and a lower light beam filament, a selectively operable lighting switch for energizing and de-energizing said filaments from said source of electric energy, and a dimmer switch for selecting either the upper light beam filament or the lower light beam filament, a driving light system, comprising, an electric driving lamp mounted to cast a beam exterior of the vehicle, circuit means connecting said lamp to said dimmer switch so that said lamp is energized when said dimmer switch is positioned to select the upper light beam filament and de-energized when said dimmer switch is positioned to select the lower beam filament, manually operated switch means for opening and closing the circuit means from the dimmer switch to the driving lamp independently of the lighting switch, and a shunt switch connected across said manually operated switch means, said dimmer switch and said lighting switch for energizing and de-energizing said lamp with said manually operated switch means and said lighting switch open.

2. In combination with a motor vehicle headlighting system comprising a source of electric energy, a high beam filament, a lighting switch for energizing the high beam filament from the source of electric energy, and a dimmer switch for selecting the high beam filament, a driving light system, comprising, a single filament driving lamp adapted to be pivoted to a position in cooperation with the high beam operably connected to the dimmer switch for energization from the source of electric energy with the lighting switch closed and the dimmer switch positioned to select the high beam, and photo-electrically controlled means interposed between the dimmer switch and said driving lamp automatically operable to completely de-energize said lamp.

3. In combination with a motor vehicle headlighting system comprising a source of electric energy, a high beam filament adapted to be energized from the source of electric energy and a dimmer switch positioned to select the high beam filament, a spotlight comprising, a lamp casing pivotably supported on one end of a housing and a handle for pivoting the lamp casing supported on the other end of said housing, an electric lamp mounted within the casing, separate terminals mounted in said housing for connection to the dimmer switch and to the source of electric energy, a manually operable contactor for engaging said separate terminals, and a terminal connected to said lamp for engagement by said contactor for energization of said lamp from said dimmer switch when said contactor is moved into engagement with the terminal connected to said dimmer switch and for continuous energization of said lamp when the contactor is moved into engagement with the terminal connected to the source of electric energy.

4. In combination with a motor vehicle headlighting system, comprising, a source of electric energy, an upper light beam headlamp filament terminal, a selectively operable lighting switch for energizing said terminal from said source of electric energy, and a dimmer switch for selecting said terminal, a driving light system, comprising, a single filament electric lamp mounted to cast a beam exterior of the vehicle, light sensitive means connected to said upper beam terminal for de-energization of said lamp independently of said lighting switch with said lighting switch closed and said dimmer switch positioned to select said upper beam terminal.

5. In combination with a motor vehicle headlighting system, comprising, a source of electric energy, an upper light beam headlamp filament terminal, a selectively operable lighting switch for energizing said terminal from said source of electric energy, and a dimmer switch for selecting said terminal, a driving light system, comprising, a single filament electric lamp mounted to cast a beam exterior of the vehicle, light sensitive means connected to said upper beam terminal for de-energization of said lamp independently of said lighting switch with said lighting switch closed and said dimmer switch positioned to select said upper beam terminal, and a switch connected across said light sensitive means, said dimmer switch and said lighting switch to shunt them and energize and de-energize said lamp with said lighting switch open.

6. In combination with a motor vehicle headlighting system, comprising, a source of electric energy, a headlight, and a selectively operable lighting switch for energizing said headlight from said source of electric energy, a driving light system, comprising, a spotlight adapted to be energized when said lighting switch is closed, light sensitive means for completely de-energizing said spotlight with said lighting switch closed and said headlight energized, and means for shunting said light sensitive means and energizing said spotlight with said lighting switch open.

7. In combination with a motor vehicle lighting system, comprising, a source of electric energy, a headlight, and a selectively operable lighting switch for energizing said headlight from said source of electric energy, a driving light system, comprising, a spotlight connected to said lighting switch for energization of said spotlight, light sensitive means for completely de-energizing said spotlight when said lighting switch is closed and said filament is energized, means for disconnecting said spotlight from said lighting switch, and means connected to said source of electric energy for energizing said spotlight with said lighting switch closed.

8. A driving light system, comprising, a source of electric energy, a spotlight having a single filament lamp, light sensitive means connected to said source of electric energy for energizing and completely de-energizing said lamp from said source of electric energy automatically, means for disconnecting said light sensitive means from said source of electric energy, and manually operative means for shunting said light sensitive means and energizing and de-energizing said lamp from said source of electric energy with said light sensitive means disconnected.

9. A driving light system for motor vehicles, comprising, a source electric energy, a spotlight having a single filament lamp mounted on said vehicle, a foot switch for energizing said lamp from said source of electric energy, light sensitive means interposed between said foot switch and said lamp for automatically de-energizing said lamp with said foot switch closed, and manually operative switch means for shunting said foot switch and said light sensitive means and energizing and de-energizing said lamp with said foot switch open.

10. In combination with a motor vehicle headlighting system comprising, in combination, a source of electric energy, an upper light beam filament and a lower light beam filament, a selectively operable lighting switch for energizing and de-energizing said filaments from said source of electric energy, and a dimmer switch for selecting either the upper light beam filament or the lower light beam filament, a driving light system comprising, an electric driving lamp mounted to cast a beam exterior of the vehicle, a double throw double pole switch means for opening and closing the circuit from the dimmer switch to said driving lamp and to shunt said dimmer switch and said lighting switch for energizing and de-energizing said lamp with said lighting switch open, and light sensitive means interposed betwen said dimmer switch and said lamp automatically operable to completely de-energize said lamp independently of said dimmer switch and double switch means with said lighting switch closed.

11. A driving light system, comprising, a source of electric energy, a spotlight having a single filament lamp, light sensitive means for energizing and completely de-energizing said lamp from said source of electric energy, and manually operable means for energizing and de-energizing said lamp from said source of electric energy with said light sensitive means disconnected.

12. In combination with a motor vehicle headlighting system, comprising, a source of electric energy, a headlight and a selectively operable lighting switch for energizing and de-energizing said headlight from said source of electric energy, a driving light system, comprising, a spotlight adapted to be energized from said source of electric energy, light sensitive means for completely de-energizing said spotlight when said headlight is energized, and means for energizing said spotlight from said source of electric energy with headlight de-energized.

13. In combination with a motor vehicle headlighting system comprising a source of electric energy, a high beam filament adapted to be energized from the source of electric energy and a dimmer switch positioned to select the high beam filament, a spotlighting system comprising, a spotlamp having a lamp casing pivotably mounted exterior of the vehicle, an electric lamp mounted in one end of the casing and a handle for pivoting the casing mounted on the casing opposite the lamp, separate terminals for connection to the dimmer switch and the source of electric energy respectively, a manually operable contactor for engaging said separate terminals, and a terminal connected to said lamp for engagement by said contactor for energization of said lamp from the dimmer switch when said contactor is moved into engagement with the terminal connected to said dimmer switch and for continuous energization of said lamp when the contactor is moved into engagement with the terminal connected to the source of electric energy.

14. The invention as set forth in claim 13 including, means interposed between said dimmer switch and the terminal connected to said lamp for automatically de-energizing said lamp.

15. In combination with a motor vehicle headlighting system comprising a source of electric energy, a high beam filament adapted to be energized from the source of electric energy and a dimmer switch positioned to select the high beam filament, a spotlighting system comprising, a spotlamp having a lamp casing pivotably mounted exterior of the vehicle, an electric lamp mounted in one end of the casing, a handle for pivoting the casing mounted on the casing opposite the lamp, and a manual switch means mounted on said casing for connection to the lamp, circuit means for energizing the lamp from the dimmer switch, an auxiliary switch for opening and closing said circuit means from the dimmer switch to said lamp, and additional circuit means operable to be closed by said manual switch means for shunting said dimmer switch for continuous energization of said lamp from the source of electric energy with said high beam filament de-energized.

16. The invention as set forth in claim 15 including a provision for manual operation of said auxiliary switch means.

17. The invention as set forth in claim 15 including a provision for automatic operation of said auxiliary switch means.

18. In combination with a motor vehicle headlighting system comprising a source of electric energy, a high beam filament adapted to be energized from the source of electric energy, and a dimmer switch positioned to select the high beam filament, a spotlighting system comprising, a spotlamp having a lamp casing pivotably mounted exterior of the vehicle, an electric lamp mounted in one end of the casing, and a handle for pivoting the casing mounted on the casing opposite the lamp, manually operated switch means mounted on the vehicle for connection to the lamp, circuit means for energizing the lamp from the dimmer switch, an auxiliary switch for opening and closing said circuit means from the dimmer switch to said lamp, and additional circuit means operable to be closed by said manual switch means for shunting said dimmer switch for continuous energization of said lamp from the source of electric energy with the high beam filament de-energized.

19. The invention as set forth in claim 18 including a provision for manual operation of said auxiliary switch means.

20. The invention as set forth in claim 18 including a provision for automatic operation of said auxiliary switch means.

21. In combination with a motor vehicle headlighting system comprising a source of electric energy, an upper light beam filament and a lower light beam filament, a lighting switch for selectively energizing or de-energizing the respective upper beam or lower beam filament from the source of electric energy and a dimmer switch for selecting either the upper beam filament or the lower beam filament, a driving light system comprising, an electric driving lamp mounted to cast a beam exterior of the vehicle, circuit means connecting said lamp to the dimmer switch so that said lamp is energized with the lighting switch closed when the dimmer switch is positioned to select the upper light beam filament and de-energized when the dimmer switch is positioned to select the lower beam filament, and switch means interposed between the dimmer switch and said lamp for opening and closing said circuit means from the dimmer switch to said lamp independently of the lighting switch.

22. In combination with a motor vehicle headlighting system comprising a source of electric energy, an upper light beam filament and a lower light beam filament, a lighting switch for selectively energizing or de-energizing the respective upper beam filament or the lower beam filament from the source of electric energy and a dimmer switch for selecting either the upper beam filament or the lower beam filament, a spotlighting system comprising, a lamp pivotably supported on one end of a housing and a handle for pivoting the lamp supported on the other end of said housing, circuit means connecting said lamp to the dimmer switch so that said lamp is energized with the lighting switch closed when the dimmer switch is positioned to select the upper beam filament and de-energized when the dimmer switch is positioned to select the lower beam filament, and a switch mounted on said housing for manually opening and closing the circuit means from the dimmer switch to said lamp independently of the lighting switch.

23. In combination with a motor vehicle headlighting system comprising, a source of electric energy, an upper light beam filament and a lower light beam filament, a lighting switch for selectively energizing or de-energizing the respective upper beam filament or the lower beam filament from the source of electric energy and a dimmer switch for selecting either the upper beam filament or the lower beam filament, a driving lamp system comprising, an electric driving lamp mounted to cast a beam exterior of the vehicle, circuit means connecting said lamp to the dimmer switch so that said lamp is energized with the lighting switch closed when the dimmer switch is positioned to select the upper beam filament and de-energized when the dimmer switch is positioned to select the lower beam filament, auxiliary switch means for opening and closing said circuit means from the dimmer switch to said driving lamp independently of the lighting switch, and a shunt switch connected across said switch means, the dimmer switch and the lighting switch for energizing and de-energizing said lamp with the lighting switch open.

24. The invention as set forth in claim 23 including a provision for manual operation of said auxiliary switch means.

25. The invention as set forth in claim 23 including means for automatic operation of said auxiliary switch means.

26. In combination with a motor vehicle headlighting system comprising a source of electric energy, an upper light beam filament and a lower light beam filament, a lighting switch for selectively energizing or de-energizing the respective upper beam filament or the lower beam filament from the source of electric energy and a dimmer switch for selecting either the upper beam filament or the lower beam filament, a spotlighting system comprising, a lamp casing pivotably supported on one end of a housing, and a handle for pivoting the lamp casing supported on the other end of said housing and an electric lamp mounted within the casing, circuit means connecting said lamp to the dimmer switch for energization of said lamp when the dimmer switch is positioned to select the upper beam filament and for de-energization of said lamp when the dimmer switch is positioned to select the lower beam filament, auxiliary switch means mounted on the vehicle for opening and closing the circuit means from the dimmer switch to said driving lamp independently of the lighting switch, and a switch mounted on said housing operable to shunt said switch means, the dimmer switch and the lighting switch for energizing and de-energizing said lamp with the lighting switch open.

27. In combination with a motor vehicle headlighting system comprising a source of electric energy, an upper light beam filament and a lower light beam filament, a lighting switch for selectively energizing or de-energizing the respective upper beam filament or the lower beam filament from the source of electric energy and a dimmer switch for selecting either the upper beam filament or the lower beam filament, a driving light system comprising, an electric driving lamp mounted to cast a beam exterior of the vehicle, circuit means connecting said lamp to the dimmer switch so that said lamp is energized with the lighting switch closed when the dimmer switch is positioned to select the upper beam filament and de-energized when the dimmer switch is positioned to select the lower beam filament, switch means for manually opening and closing the circuit means from the dimmer switch to said driving lamp independently of the lighting switch, and a shunt switch connected across said switch means, the dimmer switch and the lighting switch for manually energizing and de-energizing said lamp with the lighting switch open.

28. The invention as set forth in claim 27 including a provision for automatic operation of said switch means for opening and closing the circuit means from the dimmer switch to said driving lamp.

29. In combination with motor vehicle headlighting system comprising a source of electric energy, an upper light beam filament and a lower light beam filament, a lighting switch for energizing and de-energizing the respective upper beam filament or the lower beam filament from the source of electric energy and a dimmer switch for selecting either the upper light beam filament or the lower light beam filament, a driving light system comprising, an electric driving lamp mounted to cast a beam exterior of the vehicle, circuit means connecting said lamp to the dimmer switch so that said lamp is energized with the lighting switch closed when the dimmer switch is positioned to select the upper light beam filament and de-energized when the dimmer switch is positioned to select the lower light beam filament, and a double throw double pole switch means operable to open and close the circuit means from the dimmer switch to said driving lamp independently of the lighting switch and to shunt the circuit means, the dimmer switch and the lighting switch for energizing and de-energizing said lamp with the lighting switch open.

30. In combination with a motor vehicle headlighting system comprising a source of electric energy, an upper light beam filament and a lower light beam filament, a lighting switch for selectively energizing or de-energizing the respective upper beam filament or the lower beam filament from the source of electric energy, and a dimmer switch for selecting either the upper beam filament or the lower beam filament, a spotlighting system comprising, a lamp pivotably supported on one end of a housing and a handle for pivoting the lamp supported on the opposite end of said housing, separate terminals mounted on the vehicle for connection to the dimmer switch and the source of electric energy respectively, a manually operable contactor for selectively engaging said separate terminals, and a terminal connected to said lamp for engagement by said contactor for energization of said lamp with the lighting switch closed and the dimmer switch positioned to select the upper beam filament when said contactor is moved into engagement with the terminal connected to the dimmer switch and for shunting the dimmer switch and the lighting switch for continuous energization to said lamp when said contactor is moved into engagement with said terminal connected to the source of electric energy with the lighting switch open.

31. A driving light system for a motor vehicle comprising, in combination, a source of electric energy, a spotlight mounted on the vehicle having an electric lamp pivotably supported on one end of a housing and a handle for pivoting said lamp supported on the opposite end of said housing, a remote controlled switch mounted on said vehicle for energizing said lamp from said source of electric energy, auxiliary switch means interposed between said remote controlled switch and said lamp for de-energizing said lamp with said remote controlled switch closed, and a manually operable switch means mounted on said housing for shunting said remote controlled switch and energizing said lamp from the source of electric energy with said remote controlled switch open.

32. The invention as set forth in claim 31 including a provision for manual operation of said auxiliary switch means.

33. The invention as set forth in claim 31 including a provision for automatic operation of said auxiliary switch means.

34. A driving light system for a motor vehicle comprising, in combination, a source of electric energy, a spotlight mounted on the vehicle having an electric lamp pivotably supported on one end of a housing and a handle for pivoting said lamp supported on the opposite end of the housing, a remote controlled switch means mounted on said vehicle for energizing said lamp from the source of electric energy, auxiliary switch means interposed between said remote controlled switch means and said lamp for de-energizing said lamp with said remote controlled switch means closed, and a manually operable switch means for shunting said remote controlled switch means and energizing said lamp with said remote controlled switch means open.

35. The invention as set forth in claim 34 including a provision for manual operation of said auxiliary switch means.

36. The invention as set forth in claim 34 including a provision for automatic operation of said auxiliary switch means.

37. A driving light system for a motor vehicle comprising, in combination, a source of electric energy, a spotlight mounted on the vehicle having an electric lamp pivotably supported on one end of a housing and a handle for pivoting said lamp supported on the opposite end of said housing, a dimmer switch mounted on said vehicle for energizing said lamp from the source of electric energy, auxiliary switch means interposed between said dimmer switch and said lamp for de-energizing said lamp with the dimmer switch closed, and a manually operable switch means mounted on said vehicle for shunting said dimmer switch and energizing said lamp from the source of electric energy with said dimmer switch open.

38. The invention as set forth in claim 37 including a provision for manual operation of said auxiliary switch means.

39. The invention as set forth in claim 37 including a provision for automatic operation of said auxiliary switch means.

40. A driving light system for a motor vehicle comprising, in combination, a source of electric energy, a spotlight mounted on the vehicle having an electric lamp pivotably supported on one end of a housing and a handle for pivoting said lamp supported on the opposite end of said housing, a dimmer switch connected to the source of electric energy, separate terminals mounted in said housing for connection to the dimmer switch and to the source of electric energy respectively, a manually operable contactor for engaging said separate terminals, and a terminal connected to said lamp for engagement by said contactor for energization of said lamp from said dimmer switch when said contactor is moved into engagement with the terminal connected to said dimmer switch and for continuous energization of said lamp when said contactor is moved into engagement with the terminal connected to the source of electric energy.

41. The invention as set forth in claim 40 including means interposed between said dimmer switch and the terminal connected to said lamp for automatically de-energizing said lamp.

42. A driving light system for a motor vehicle comprising, in combination, a source of electric energy, a spotlight having an electric lamp pivotably supported on one end of a housing and a handle for pivoting said lamp supported on the opposite end of said housing, a dimmer switch connected to the source of electric energy, separate terminals mounted on said vehicle for connection to the dimmer switch and to the source of electric energy respectively, a manually operable contactor for engaging said separate terminals, and a terminal connected to said lamp for engagement by said contactor for energization of said lamp from the dimmer switch when said contactor is moved into engagement with the terminal connected to said dimmer switch and for continuous energization of said lamp when said contactor is moved into engagement with the terminal connected to the source of electric energy.

43. The invention as set forth in claim 42 including means interposed between said dimmer switch and the terminal connected to said lamp for automatically de-energizing said lamp.

44. In a spotlight, in combination, a support, a housing mounted on said support, a lamp casing pivotably mounted on said housing, a handle for pivoting the lamp casing mounted on the housing opposite the lamp casing, an electric lamp mounted in said casing, a block of insulation fixedly mounted in said housing, separate terminals mounted adjacently on said block and insulated from each other and from the housing for separate connection to a source of electric energy, a contactor mounted in the housing adjacent the handle having a control knob extending outwardly therefrom for manual movement from an off position to alternative positions to engage said separate terminals, resilient means for exerting pressure to retain said contactor in each of said positions against said manual movement, and a lamp terminal connected to said lamp and mounted adjacent said separate terminals but insulated therefrom and from the housing so that said lamp terminal is engaged by the contactor when said contactor is moved by said handle from the off position into contact with either of said separate terminals.

References Cited in the file of this patent
UNITED STATES PATENTS

| | | |
|---|---|---|
| 1,627,474 | Archer | May 3, 1927 |
| 1,676,608 | Hubbell | July 10, 1928 |
| 1,686,859 | Huntington | Oct. 9, 1928 |
| 1,909,077 | Schwarze | May 16, 1933 |
| 2,011,677 | Douglas | Aug. 20, 1935 |
| 2,100,657 | Edwards | Nov. 30, 1937 |
| 2,414,932 | Crockett | Jan. 28, 1947 |
| 2,417,501 | Johnston | Mar. 18, 1947 |
| 2,423,278 | Willis | July 1, 1947 |
| 2,427,076 | Tabacchi | Sept. 9, 1947 |
| 2,493,307 | Moore et al. | Jan. 3, 1950 |
| 2,495,266 | Kruger | Jan. 24, 1950 |
| 2,598,420 | Onksen | May 27, 1952 |
| 2,761,026 | Youhouse | Aug. 28, 1956 |